United States Patent [19]

Shimada et al.

[11] Patent Number: 4,507,430

[45] Date of Patent: Mar. 26, 1985

[54] WATER-BASE POLYURETHANE EMULSION

[75] Inventors: Shigeru Shimada; Akira Kuroda; Junichi Tomiuga; Shinzi Ishikawa, all of Tokyo, Japan

[73] Assignee: Hodogaya Chemical Co., Ltd., Tokyo, Japan

[21] Appl. No.: 637,267

[22] Filed: Aug. 3, 1984

Related U.S. Application Data

[63] Continuation-in-part of Ser. No. 523,761, Aug. 17, 1983, abandoned.

[30] Foreign Application Priority Data

Dec. 20, 1982 [JP] Japan .................................. 57-221968

[51] Int. Cl.$^3$ ....................... C08G 18/62; C08L 75/04
[52] U.S. Cl. .................................... 524/839; 524/840; 524/591
[58] Field of Search ........................ 524/591, 839, 840

[56] References Cited

U.S. PATENT DOCUMENTS

| | | | |
|---|---|---|---|
| 3,983,058 | 9/1976 | Hirooka | 524/591 |
| 3,988,278 | 10/1976 | Bartizal | 524/839 |
| 3,993,614 | 11/1976 | Carlson | 524/840 |
| 4,152,309 | 5/1979 | Isichi | 528/75 |
| 4,208,311 | 6/1980 | Kinoshita et al. | 524/591 |
| 4,376,840 | 3/1983 | Moriwaki | 524/871 |
| 4,389,509 | 6/1983 | Pampouchidas et al. | 524/591 |

FOREIGN PATENT DOCUMENTS 56-13327 10/1981 Japan .................................. 524/873

*Primary Examiner*—C. Warren Ivy
*Attorney, Agent, or Firm*—Oblon, Fisher, Spivak, McClelland & Maier

[57] ABSTRACT

A water-base polyurethane emulsion useful as an adhesive or coating material for a polyolefin resin, which comprises a polyol component and a polyisocyanate component, characterized in that a hydrogenated polyalkadiene polyol is used as the polyol component.

11 Claims, No Drawings

WATER-BASE POLYURETHANE EMULSION

This is a continuation-in-part of application Ser. No. 523,761, filed Aug. 17, 1983, now abandoned.

BACKGROUND OF THE INVENTION

1. Field of the Invention

The present invention relates to a water-base polyurethane emulsion particularly useful as an adhesive or coating material for a polyolefin resin.

2. Description of the Prior Art

Water-base polyurethane emulsions are used in various fields, for instance, as adhesive, impregnation agents or coating agents. A variety of excellent polymers ranging from soft elastomers to hard plastics are obtainable by reacting various types of polyisocyanate compounds with active hydrogen compounds having at least two active hydrogen atoms such as hydroxyl groups or amino groups. They are of great interest particularly in the field of adhesives, since they exhibit an excellent adhesive property to a variety of substrates such as plastics, metals, woods and papers.

However, the conventional water-base polyurethane emulsions are hardly bonded to a polyolefin resin material having little functional groups in its structure, such as a polyethylene resin or a polypropylene resin. Accordingly, their application in this respect has been limited. As a method for improving the adhesion to a polyolefin resin material, it is common to conduct corona discharge treatment to activate the resin surface. However, even to such a surface-treated polyolefin resin material, none of the conventional water-base emulsions including water-base polyurethane emulsions show adequate adhesion to a practical extent.

Polyolefin resins have excellent electric, mechanical and chemical properties, and there is an increasing demand for such polyolefin resins in various fields. Under the circumstances, it is an important objective in the market to develop a water-base emulsion adhesive which satisfies the requirements for non-pollution, fire-safety, conservation of resources, etc.

SUMMARY OF THE INVENTION

The present inventors have conducted various researches for water-base polyurethane emulsions compatible with such polyolefin resin materials, and finally found that the following water-base polyurethane emulsion exhibits excellent compatibility such as adhesion to the polyolefin resin materials. The present invention has been accomplished based on this discovery.

Namely, the present invention provides a water-base polyurethane emulsion comprising a polyol component and a polyisocyanate component, wherein a hydrogenated polyalkadiene polyol is used as the polyol component.

DETAILED DESCRIPTION OF THE PREFERRED EMBODIMENTS

Now, the present invention will be described in detail with reference to the preferred embodiments.

The hydrogenated polyalkadiene polyol of the present invention is preferably a hydrogenated polybutadiene polyol, a hydrogenated poly-1,3-pentadiene polyol, or a hydrogenated polyol of a copolymer of a conjugated diene monomer such as 1,3-butadiene or 1,3-ppentadiene, with an olefin monomer such as styrene, acrylonitrile, methacrylonitrile, methyl acrylate or ethylmethacrylate, the content of the conjugated diene monomer being at least 50% by weight, preferably at least 70% by weight, of the total monomers.

A preferred hydrogenated polyalkadiene polyol to be used in the present invention has an average molecular weight of from 500 to 4000, preferably from 1000 to 2500, an average number of functional hydroxyl groups of from 1.5 to 3, preferably about 2, and a hydrogen saturation degree of at least 40%, preferably at least 70%.

A partiularly preferred hydrogenated polyalkadiene polyol is a polybutadiene polyol having a high hydrogen saturation degree.

The hydrogenated polyalkadiene polyol may be prepared, for instance, by reacting a living polymer of butadiene obtained by e.g. radical polymerization or anionic polymerization of 1,3-butadiene, with an epoxy compound by a conventional method, followed by treatment with a protonic acid such as hydrochloric acid or sulfuric acid, and subjecting the resulting polybutadiene polymer to a hydrogenation reaction in the presence of a catalyst such as nickel, vanadium or Raney nickel.

In the present invention, the hydrogenated polyalkadiene polyol may be used in combination with one or more conventionally employed polyols such as polyoxytetramethylene glycol, polyoxypropylene polyol, polyoxyethylene polyol, a polyol obtained by the addition of ethylene oxide or propylene oxide to bisphenol A, polyethyleneadipate polyol, polypropyleneadipate polyol, polybutyleneadipate polyol, polycarbonate polyol, polyhexamethyleneadipate polyol, polycaprolactone polyol, polybutadiene polyol, ethylene glycol, propylene glycol, 1,4-butanediol and 1,6-hexanediol. Such an additional polyol may be incorporated at the time of the preparation of the water-base polyurethane emulsion, or a water-base polyurethane emulsion separately prepared from such an additional polyol may be mixed with the water-base polyurethane emulsion of the present invention.

In a case where a polyolefin resin material is to be bonded with a different material by means of the water-base polyurethane emulsion of the present invention, it is effective to use as the polyol component a polyol having a good adhesive property to the different material, in combination with the hydrogenated polyalkadiene polyol. For instance, in a case where a polypropylene foam is to be bonded to a soft polyvinyl chloride as in the case of automobile interior materials such as an interior lining of the door or the instrument panel, it is preferable to use the hydrogenated polyalkadiene polyol in combination with a polyester polyol such as polybutyleneadipate polyol, polyhexamethyleneadipate polyol, polycaprolactone polyol or polyhexamethylenecarbonate polyol which exhibits good adhesion to the soft polyvinyl chloride. However, the adhesion to the polyolefin resin material decreases as the content of the hydrogenated polyol of the present invention in the polyol component decreases. Therefore, the content of the hydrogenated polyalkadiene polyol is usually at least 20% by weight, preferably at least 40% by weight.

As the polyisocyanate compound to be reacted with the hydrogenated polyalkadiene polyol, there may be mentioned conventional polyisocyanate compounds such as tolylene diisocyanate, 4,4'-diphenylmethane diisocyanate, naphthylene diisocyanate, 1,6-hexamethylene diisocyanate, xylylene diisocyanate, isophorone diisocyanate, 4,4'-methylene bis(cyclohexyl isocyanate), 1,3-bis(isocyanatomethyl) cyclohexane or 2,2,4- or 2,4,4-trimethylhexamethylene diisocyanate.

There is no particular restriction to the process for preparing the water-base polyurethane emulsion of the present invention. Conventional processes for the preparation of water-base polyurethane emulsions may be employed. For instance, a polyurethane prepolymer is prepared from the polyol and the polyisocyanate in the presence or absence of a solvent, and then the polyurethane prepolymer is mechanically dispersed in water by using a surfactant or the polyurethane prepolymer is reacted with an active hydrogen compound having an anionic or cathionic salt-forming group, to obtain a water-base product. Further, it is possible to introduce a blocked isocyanate group by reacting the polyol component with the above-mentioned polyisocyanate compound which has been partially blocked by a phenol such as phenol, o-cresol or xylenol; a lactam such as γ-butyrolactam or ε-caprolactam; an oxime such as methyl ethyl ketoxime or acetoxime; an imide such as succinic acid imide or phthalic acid imide; or a sulfite such as acidic sodium sulfite, or by reacting a terminal isocyanate prepolymer preliminarily prepared from the polyol component and the polyisocyanate compound, with a blocking compound.

The water-base polyurethane emulsion of the present invention may be used in combination with other water-base emulsions such as an acryl emulsion, a styrene-butadiene latex, a vinyl acetate emulsion, a vinyl chloride emulsion or an epoxy emulsion.

The water-base polyurethane emulsion of the present invention may be applied to polyolefin resin materials such as films, sheets, molded products or foams made of a low density, moderate density or high density polyethylene, polypropylene, polyethylenepropylene copolymer, poly-1-butene, poly-4-methyl-1-pentene, polyethylene-1-butene copolymer, polypropylene-1-butene copolymer or polyethylene-propylene-diene terpolymer. It exhibits particularly remarkable effects when applied to foams.

When the water-base polyurethane emulsion of the present invention is used as an adhesive, it is thickened, as the case requires, then applied to a polyolefin resin material by a proper method such as brushing, roll coating, spraying or immersing, and dried at a temperature of at least the continuous film-forming temperature (M.F.T), whereby good adhesion is obtainable. If heat treatment is conducted, the effectiveness is further improved, whereby a very strong bonding strength is obtainable. In the case where the water-base polyurethane emulsion of the present invention contains a blocked isocyanate group, it is, of course, desirable that the heat treatment is conducted at a temperature of at least the dissociation temperature of the blocked isocyanate group. Further, the water-base polyurethane emulsion of the present invention may be bonded by a so-called dry lamination wherein it is preliminarily applied to a separate substrate and dried to form a coating film having a proper softening point, and then bonded to the polyolefin resin material by heat-pressing.

Now, the present invention will be described in further detail with reference to Examples and Comparative Examples, wherein "parts" means "parts by weight".

EXAMPLE 1

1122.0 parts of a hydrogenated polybutadiene polyol (starting material polybutadiene: 1,4-bond 19%, 1,2-bond 81%) having a OH value of 50.0, an average number of functional hydroxyl groups of 1.9, a hydrogen saturation degree of at least 99% (iodine value: 3.9 g/100 g) and an average molecular weight of about 2000 (Polytail HA, manufactured by Mitsubishi Chemical Industries, Ltd.) was dehydrated under reduced pressure of 1 mmHg at 100° C. Then, the temperature was lowered to 40° C., and 179.5 parts of tolylene diisocyanate was added thereto. The mixture was reacted at 85° C. for 3 hours. To the polyurethane prepolymer thus obtained, 119.1 parts of a half-ester compound prepared from 400.0 parts of polyoxypropylene triol having a OH value of 421 and an average molecular weight of 400 and 98.0 parts of maleic anhydride and having an acid value of 111.5, and 250.7 parts of xylene were added. The mixture was reacted in a nitrogen stream at 85° C. for 3 hours, whereby a terminal isocyanate prepolymer containing a carboxyl group was obtained. While maintaining this prepolymer at 85° C., it was introduced and emulsified into 1889 parts of an aqueous solution containing 9.3 parts of sodium hydroxide under stirring with a homomixer, whereupon a milky white polyurethane emulsion having a solid content of 40.3% was obtained. This polyurethane emulsion is designated as water-base polyurethane (a).

EXAMPLE 2

1193.6 parts of a hydrogenated polybutadiene polyol (starting material polybutadiene: 1,4-bond 81%, 1,2-bond 19%) having a OH value of 47.0, an average number of functional hydroxyl groups of 2.1, a hydrogen saturation degree of at least 99% (iodine value: 3.9 g/100 g) and an average molecular weight of about 2000 (Polytail H, manufactured by Mitsubishi Chemical Industries, Ltd. ) was dehydrated under reduced pressure in the same manner as in Example 1, and 292.3 parts of isophorone diisocyanate was added. The mixture was reacted at 90° C. for 5 hours. To the polyurethane prepolymer thus obtained, 210.7 parts of a half-ester compound synthesized from 400.0 parts of polyoxypropyrene triol having a OH value of 421 and an average molecular weight of 400 and 148.0 parts of phthalic anhydride and having an acid value of 100.4, and 27.1 parts of xylene were added. The mixture was reacted in nitrogen stream at 90° C. for 4 hours, whereby a terminal isocyanate prepolymer containing a carboxyl group was obtained. While maintaining this prepolymer at 90° C., it was introduced and emulsified into 1833 parts of an aqueous solution containing 14.8 parts of sodium hydroxide under stirring with a homomixer, whereupon a milky white polyurethane emulsion having a solid content of 40.7% was obtained. This polyurethane emulsion is designated as water-base polyurethane (b).

EXAMPLE 3

A polyol mixture comprising 640.7 parts of the same hydrogenated polybutadiene polyol as used in Example 1 and 426.7 parts of polyoxypropylene glycol having a OH value of 56.4, was dehydrated under reduced pressure of 1 mmHg at 100° C. Then, the temperature was lowered to 60° C., and 258.8 parts of 2,3-bis-(isocyanatomethyl)cyclohexane was added thereto. The mixture was reacted at 90° C. for 4 hours. To the polyurethane prepolymer thus obtained, 62.0 parts of dimethylol propionic acid and 189.3 parts of diethylene glycol dimethyl ether were added. The mixture was reacted in a nitrogen stream at 100° C. for 4 hours, whereby a terminal isocyanate prepolymer containing a carboxyl group was obtained. While maintaining this prepolymer at 100° C., it was introduced and emulsified into 2239 parts of an aqueous solution containing 53.1 parts of diethanol amine under stirring with a homomixer, whereupon a milky white polyurethane emulsion having a solid content of 39.8% was obtained. This polyurethane emulsion is designated as water-base polyurethane (c).

COMPARATIVE EXAMPLE 1

A polyurethane emulsion having a solid content of 39.9% was prepared in the same manner as in Example 1 except that instead of the hydrogenated polybutadiene polyol (Polytail HA), a polybutadiene polyol (1,4-bond 80%, 1,2-bond 20%) having a OH value of 47.1, an average molecular weight of 2500, an average number of functional hydroxyl groups of 2.4 and an iodine value of 398 g/100 g (POLY-BD-R-45HT manufactured by ARCO CHEMICAL CO., U.S.A.) was used. This polyurethane emulsion is designated as water-base polyurethane PBD.

COMPARATIVE EXAMPLE 2

Polyurethane emulsions having a solid content of 40% were prepared in the same manner as in Example 1 except that instead of the hydrogenated polybutadiene polyol (Polytail HA), polyols identified in Table 1 and having an average molecular weight of about 2000 were used respectively. The polyurethane emulsions were designated as shown in Table 1.

The sample thus obtained was preliminarily dried in a hot air dryer at 80° C. for 5 minutes, and then heat-press bonded by a scorch tester manufactured by Atlas Co. (pressure: 0.3 kg/cm$^2$, time: 60 seconds, temperature: as shown in the Table). The sample was maintained at 20° C. at a relative humidity of 65% for one day, and then cut into a test piece having a width of 1 inch. The test piece was subjected to a peeling test at 180° C. at a pulling speed of 200 mm/min. by means of Tensilon UTM-III 100 model manufactured by Toyo Baldwin Co., Ltd. The results are shown in Table 2 as an average value of five test pieces.

TABLE 2

Adhesion to the corona discharge treated polypropylene foam[1]

| | Property Bonding strength against peeling (kgf/inch) Heat treatment temperature | | |
|---|---|---|---|
| Water-base polyurethanes | 120° C. | 130° C. | 140° C. |
| Present Invention | | | |
| Water-base polyurethane (a) | 1.38 | 2.07* | 2.37* |
| Water-base polyurethane (b) | 1.23 | 2.12* | 2.35* |
| Water-base polyurethane (c) | 1.15 | 1.98* | 2.25* |
| Comparative Examples | | | |
| Water-base polyurethane PBD | 0.73 | 1.11 | 1.29 |
| Water-base polyurethane PPG | 0.24 | 0.37 | 0.38 |
| Water-base polyurethane BAP | 0.22 | 0.27 | 0.37 |
| Water-base polyurethane PEA | 0.19 | 0.23 | 0.36 |
| Water-base polyurethane PBA | 0.26 | 0.29 | 0.41 |
| Water-base polyurethane P(H/N)A | 0.23 | 0.27 | 0.35 |
| Water-base polyurethane PCL | 0.18 | 0.24 | 0.38 |
| Water-base polyurethane PHC | 0.21 | 0.24 | 0.40 |

Notes:
*The marking indicates that the polypropylene foam was ruptured. No marking indicates the interfacial peeling on the surface of polypropylene foam.
[1] A corona discharge treated product of "Toray PEF" Grade 25030 type AR 60 manufactured by Toray Industries, Inc.

TABLE 1

Preparation of polyurethane emulsions (Comparative Samples)

| Polyurethane emulsions (Designated names) | Polyols used | | | |
|---|---|---|---|---|
| | Kind | Trade Names | OH value | Manufacturers |
| Water-base polyurethane PPG | Polyoxypropylene glycol | Uniol D-2000 | 56.4 | Nippon Oil and Fats Co., Ltd. |
| Water-base polyurethane BAP | Propyleneoxide addition diols of bisphenol A | Uniol DB-2000 | 55.9 | Nippon Oil and Fats Co., Ltd. |
| Water-base polyurethane PEA | Polyethyleneadipate diol | Nippollan 4040 | 56.0 | Nippon Polyurethane Industries Co., Ltd. |
| Water-base polyurethane PBA | Polybutyleneadipate diol | Nippollan 4010 | 55.6 | Nippon Polyurethane Industries Co., Ltd. |
| Water-base polyurethane P(H/N)A | Polyhexamethylene neopentyladipate diol | Nippollan 4070 | 56.5 | Nippon Polyurethane Industries Co., Ltd. |
| Water-base polyurethane PCL | Polycaprolactone diol | Placcel 220 | 56.2 | Daicel Chemical Industries Co., Ltd. |
| Water-base polyurethane PHC | Polyhexamethylenecarbonate diol | Desmophen 2020 | 56.4 | Farbenfabriken Bayer A.G. |

EXAMPLE 4

With respect to eleven water-base polyurethanes prepared in Examples 1 to 3 and Comparative Examples 1 and 2, the adhesive properties to the corona discharge treated polypropylene foam and the effects of the heat treatment temperature on the adhesive properties were investigated. For the adhesion tests, from 2 to 4 parts of a polyvinyl pyrrolidone thickener (LV-30 manufactured by Hodogaya Chemical Co., Ltd.) was added to 100 parts of each of the water-base polyurethanes of the present invention and the Comparative Examples, and each thickened water-base polyurethanes was coated on a polypropylene foam having a size of 100×100 mm in a thickness of 100 μm (wet thickness) by means of an applicator. Then, a cotton cloth was immediately press-bonded (the cotton cloth was used for the reason that it is porous and all of the water-base polyurethanes exhibit stronger adhesion to it than to the polypropylene foam).

As shown in Table 2, the water-base polyurethanes (a), (b) and (c) of the present invention are superior to the eight kinds of the water-base polyurethanes of the Comparative Examples in their adhesion to the corona discharge treated polypropylene foam. Particularly, the water-base polyurethanes (a), (b) and (c) wherein a hydrogenated polybutadiene polyol having a high saturation degree was used, showed strong bonding to the polypropylene foam when treated at a temperature of at least 130° C., whereby the substrate polypropylene foam ruptured in the peeling test.

EXAMPLE 5

In the same manner as in Example 4, the eleven water-base polyurethane emulsions of the present invention and the Comparative Examples were tested for the adhesion to the non-corona discharge treated polypropylene foam. The results are shown in Table 3.

TABLE 3

Adhesion to the non-corona discharge treated polypropylene foam[1]

| Water-base polyurethanes | Property Bonding strength against Peeling (kgf/inch) Heat treatment temperature | | |
|---|---|---|---|
| | 120° C. | 130° C. | 140° C. |
| Present Invention | | | |
| Water-base polyurethane (a) | 1.35 | 2.15* | 2.33* |
| Water-base polyurethane (b) | 1.14 | 2.03* | 2.41* |
| Water-base polyurethane (c) | 1.09 | 1.98* | 2.21* |
| Comparative Examples | | | |
| Water-base polyurethane PBD | 0.75 | 1.07 | 1.25 |
| Water-base polyurethane PPG | 0.22 | 0.32 | 0.43 |
| Water-base polyurethane BAP | 0.19 | 0.27 | 0.34 |
| Water-base polyurethane PEA | 0.15 | 0.17 | 0.38 |
| Water-base polyurethane PBA | 0.18 | 0.25 | 0.40 |
| Water-base polyurethane P(H/N)A | 0.20 | 0.24 | 0.36 |
| Water-base polyurethane PCL | 0.22 | 0.29 | 0.42 |
| Water-base polyurethane PHC | 0.17 | 0.23 | 0.35 |

Notes:
*The marking indicates that the polypropylene foam was ruptured. No marking indicates the interfacial peeling on the surface of polypropylene foam.
[1]"Toray PEF" Grade 25030 type AR 60 manufactured by Toray Industries, Inc.

As shown in Table 3, the adhesive properties of the water-base polyurethanes of the present invention and the Comparative Examples to the non-corona discharge treated polypropylene foam exhibited the same tendency as the adhesive properties to the corona discharge treated polypropylene foam in Example 4, and the water-base polyurethanes of the present invention had excellent adhesive properties.

EXAMPLE 6

With respect to the water-base polyurethane (a), the adhesion to the polyethylene foam and polyethylene-propylene foam treated or non-treated by corona discharge, was investigated in the same manner as in Example 4. The results thereby obtained are shown in Table 4.

TABLE 4

The adhesion to polyethylene foam and polyethylene-propylene foam

| Kind of the foam | Corona dishcarge treatment | Property Bonding strength against peeling (kgf/inch) Heat treatment temperature | | | |
|---|---|---|---|---|---|
| | | 100° C. | 110° C. | 120° C. | 130° C. |
| Polyethylene foam[1] | No | 0.57 | 1.14 | 1.38* | — |
| | Yes | 0.87 | 1.35 | 1.43* | — |
| Polyethylene-propylene foam[2] | No | — | 0.87 | 1.39* | 1.52* |
| | Yes | — | 1.23 | 1.73* | 1.71* |

Notes:
*The marking indicates that the foam was ruptured. No marking indicates the interfacial peeling on the surface of foam.
[1]"Toray PEF" Grade 20040 type AA00 manufactured by Toray Industries, Inc.
[2]"Toray PEF" Grade 25030 type AS60 manufactured by Toray Industries, Inc.

As shown in Table 4, the water-base polyurethane (a) of the present invention exhibited good adhesion to the polyethylene and polyethylene-propylene foams. It is particularly remarkable that it showed excellent adhesion at a low temperature to the corona discharge treated product as compared with the adhesion to the non-treated product.

EXAMPLE 7

With respect to a blend product comprising the water-base polyurethane (a) of the present invention and the water-base polyurethane (PPG) of Comparative Example 2, the adhesion test to the non-corona discharge treated polypropylene foam was conducted in the same manner as in Example 4. The results thereby obtained are shown in Table 5.

TABLE 5

The adhesion of the blend product of water-base polyurethane (a)/water-base polyurethane (PPG) to the non-corona discharge treated polypropylene foam[1]

| The ratio of water-base polyurethane (a) to water-base polyurethane (PPG) | Property Bonding strength against peeling (kgf/inch) Heat treatment temperature | | |
|---|---|---|---|
| | 120° C. | 130° C. | 140° C. |
| 10/0 | 1.35 | 21.5* | 2.33* |
| 7/3 | 1.22 | 1.75* | 2.05* |
| 5/5 | 0.86 | 1.37 | 1.78* |
| 3/7 | 0.61 | 0.92 | 1.13 |
| 0/10 | 0.22 | 0.32 | 0.43 |

Notes:
*The marking indicates that the polypropylene foam was ruptured. No marking indicates the interfacial peeling on the surface of polypropylene foam.
[1]"Toray PEF" Grade 25030 type AR-60 manufactured by Toray Industries, Inc.

As shown in Table 5, the adhesive property of the blend product of water-base polyurethane (a) and water-base polyurethane (PPG) to the polypropylene foam lowered with the decrease of the amount of water-base polyurethane (a). Therefore, the amount of the water-base polyurethane (a) should be at least 30% by weight, preferably at least 50% by weight.

What is claimed is:

1. A water-base polyurethane emulsion useful as an adhesive or coating material for a polyolefin resin, which comprises a polyol component and a polyisocyanate component, characterized in that a hydrogenated polyalkadiene polyol is used as the polyol component.

2. The water-base polyurethane emulsion according to claim 1, wherein the hydrogenated polyalkadiene polyol has an average molecular weight of from 500 to 4,000, an average number of functional hydroxyl groups of from 1.5 to 3, and a hydrogen saturation degree of at least 40%.

3. The water-base polyurethane emulsion according to claim 1, wherein the hydrogenated polyalkadiene polyol is a hydrogenated polybutadiene polyol.

4. The water-base polyurethane emulsion according to claim 1, wherein the hydrogenated polybutadiene polyol is a hydrogenated poly-1,3-pentadiene polyol.

5. The water-base polyurethane emulsion according to claim 1, wherein the hydrogenated polyalkadiene polyol is a hydrogenated polyol of a copolymer of a conjugated diene monomer selected from the group consisting of 1,3-butadiene and 1,3-pentadiene, with an olefin monomer selected from the group consisting of styrene, acrylonitrile, methacrylonitrile, methylacrylate and ethylmethacrylate, the content of the conjugated diene monomer being at least 50% by weight of the total monomers.

6. The water-base polyurethane emulsion according to claim 1, wherein the polyisocyanate component is selected from the group consisting of tolylene diisocyanate, 4,4'-diphenylmethane diisocyanate, naphthylene, diisocyanate, 1,6-hexamethylene diisocyanate, xylylene diisocyanate, isophorone diisocyanate, 4,4'-methylene bis(cyclohexyl isocyanate), 1,3-bis(isocyanatomethyl)-cyclohexane and trimethyl hexamethylene diisocyanate.

7. The water-base polyurethane emulsion according to claim 1, wherein the polyol component further contains at least one polyol selected from the group consisting of polyoxytetramethylene glycol, polyoxypropylene polyol, polyoxyethylene polyol, a polyol obtained by the addition of ethyleneoxide or propyleneoxide to bisphenol A, polyethyleneadipate polyol, polypropyleneadipate polyol, polybutyleneadipate polyol, polycarbonate polyol, polyhexamethyleneadipate polyol, polycaprolactone polyol, ehtylene glycol, propylene glycol, 1,4-butane diol and 1,6-hexane diol.

8. The water-base polyurethane emulsion according to claim 7, wherein the polyol component contains at least 20% by weight of the hydrogenated polyalkadiene polyol.

9. A water-base polyurethane emulsion useful as an adhesive or coating material for a polyolefin resin, which is prepared by reacting a hydrogenated polybutadiene polyol with a polyisocyanate compound to form a polyurethane prepolymer and emulsifying the polyurethane prepolymer in water.

10. The water-base polyurethane emulsion according to claim 9, wherein the polyurethane prepolymer is reacted with an active hydrogen compound having an anionic or a catonic salt-forming group prior to the emulsification.

11. The water-base polyurethane emulsion according to claim 10, wherein the active hydrogen compound is a half-ester of polyoxypropylene triol.

* * * * *